United States Patent
Kim

[19]

[11] Patent Number: 6,011,972
[45] Date of Patent: Jan. 4, 2000

[54] TECHNIQUE FOR SETTING CELL COVERAGE

[75] Inventor: Sun-Bin Kim, Kyungki-do, Rep. of Korea

[73] Assignee: SamSung Electronics Co., Ltd., Kyungki-do, Rep. of Korea

[21] Appl. No.: 08/844,618

[22] Filed: Apr. 21, 1997

[30] Foreign Application Priority Data

Apr. 19, 1996 [KR]  Rep. of Korea ...................... 96-11955

[51] Int. Cl.[7] .............................. H04Q 7/20; H04B 1/38; H04B 17/00

[52] U.S. Cl. ...................... 455/446; 455/424; 455/423; 455/425; 455/67.1; 455/67.4; 455/561

[58] Field of Search .................................... 455/446, 447, 455/448, 449, 422, 561, 443, 444, 456, 423–424, 425, 67.3, 226.1, 226.3, 226.2, 67.1, 67.4

[56] References Cited

U.S. PATENT DOCUMENTS

| | | | |
|---|---|---|---|
| 4,144,411 | 3/1979 | Frenkiel | 455/447 |
| 4,144,496 | 3/1979 | Cunningham et al. | 455/447 |
| 4,704,734 | 11/1987 | Menich et al. | 455/562 |
| 4,759,051 | 7/1988 | Han | 455/437 |
| 4,860,281 | 8/1989 | Finley et al. | 370/249 |
| 4,977,399 | 12/1990 | Price et al. | 455/424 |
| 5,031,204 | 7/1991 | McKernan | 455/560 |
| 5,067,147 | 11/1991 | Lee | 455/447 |
| 5,239,671 | 8/1993 | Linquist et al. | 455/13.1 |
| 5,263,177 | 11/1993 | Schieve et al. | 455/403 |
| 5,289,526 | 2/1994 | Chymyck et al. | 455/424 |
| 5,471,146 | 11/1995 | Krayeski et al. | 455/67.1 |
| 5,561,839 | 10/1996 | Osterberg et al. | 455/446 |
| 5,572,510 | 11/1996 | Koivu | 455/423 |
| 5,768,688 | 6/1998 | Owada | 455/67.4 |

FOREIGN PATENT DOCUMENTS

| | | |
|---|---|---|
| 2236457 | 9/1990 | United Kingdom . |
| 2555881 | 4/1992 | United Kingdom . |

*Primary Examiner*—Dwayne D. Bost
*Assistant Examiner*—Tracy M. Legree
*Attorney, Agent, or Firm*—Robert E. Bushnell, Esq.

[57] ABSTRACT

An apparatus for setting cell coverage for a radio communication system, includes: first and second portable devices; base station equipment having a switch which loops back a signal from the first portable device to the second portable device in a zig mode; a mode setter for setting the zig mode, the mode setter being located in one of either the first or second portable devices or the base station equipment; and a detector for detecting a received electric field strength from the signal looped back from the first portable device to the second portable device.

4 Claims, 2 Drawing Sheets

TECHNIQUE FOR SETTING CELL COVERAGE

This application makes reference to, incorporates the same herein, and claims all benefits accruing under 35 U.S.C. §119 from an application for DEVICE AND METHOD FOR SETTING CELL COVERAGE earlier filed in the Korean Industrial Property Office on the day of Apr. 19, 1996 and there duly assigned Ser. No. 11995/1996, a copy of which application is annexed hereto.

BACKGROUND OF THE INVENTION

1. Field of the Invention

The present invention relates to a technique for setting cell coverage in a radio communication system and, more particularly, to a technique for setting an optimal cell coverage, reflecting the characteristics of a base station intended to be actually established and a user's demands for the talking quality.

2. Description of the Related Art

A cell coverage determines the number of base stations to be established (this is relative to the establishment cost), and the talking quality. If a cell coverage is smaller, the number of base stations increases. If the cell coverage is larger, the number of base stations decreases but the talking quality is deteriorated. Therefore, it is very important to optimally set a cell coverage in designing a cell for a cellular or multi-cellular radio private exchange.

To decide the cell coverage, it is a general procedure to establish a signal generator at a place where a base station is intended to be established so that the signal generator generates a signal of a band which is used by the base station equipment. Then, the strength of the signal is measured by moving a signal analyzer. The measured signal is then regarded as a Received Signal Strength Indicator (hereinafter, referred to as the RSSI). Therefore, a cell coverage is determined, depending upon where the RSSI of a magnitude that enables talking is detected.

However, the characteristics of the base station equipment to be established and used cannot be considered at all if the cell coverage is determined in such a way. That is, the transmission power of the base station equipment can be considered, but the reception characteristics of the base station equipment or the transmission power and reception characteristics of the portable device cannot be considered. Therefore, in case that cells are designed and base stations are established in this way, there may show many differences from the case of actual operation.

In other words, the best way to set a cell coverage that overcomes such problems is to set the cell coverage after the user tries a call with a system actually established. But setting a cell coverage is a factor which determines the number of base stations, and influences the maintenance of the talking quality. Therefore, it is unfeasible to set a cell coverage after establishing base stations.

The following patents each disclose features in common with the present invention but do not teach or suggest the technique for setting an optimal cell coverage of the present invention.

U.S. Pat. No. 5,375,123 to Andersson et al., entitled *Allocation Of Channels Using Interference Estimation*, U.S. Pat. No. 5,561,841 to Markus, entitled *Method And Apparatus For Planning A Cellular Radio Network By Creating A Model On A Digital Map Adding Properties And Optimizing Parameters, Based On Statistical Simulation Results*, U.S. Pat. No. 5,561,839 to Osterberg et al, entitled *Method And Arrangement In Mobile Telecommunications Networks To Provide For Improved Cell Planning*, U.S. Pat. No. 5,521,958 to Selig et al, entitled *Telecommunications Test System Including A Test And Trouble Shooting Expert System*, U.S. Pat. No. 5,465,390 to Cohen, entitled *Method For Laying Out The Infrastructure Of A Cellular Communications Network*, U.S. Pat. No. 5,448,616 to Kaewell Jr. et al., entitled *Integrated Bit Error Rate Test Function In Analog Channel Unit Of digital Cellular Network*, U.S. Pat. No. 5,031,204 to McKernan, entitled *Interactive Diagnostic System For Cellular Telephones*, and U.S. Pat. No. 4,860,281 to Finley et al., entitled *Individual Subchannel Loophack In The PCM Interfaces Of A Digital Telephone Exchange With Control Of The Outbound Path*.

SUMMARY OF THE INVENTION

Accordingly, an object of the present invention is to provide an optimal technique which can minimize the differences from the case of actual operation, making up a most similar environment to the case of actual call when a base station is installed.

To accomplish the object of the present invention, there is provided a device for setting cell coverage for a radio communication system, comprising: first and second portable devices; base station equipment having a switch which loops back a signal from the first portable device to the second portable device in a zig mode; a mode setter for setting the zig mode, the mode setter being located in the first or second portable devices or in the base station equipment; and a detector for detecting a received electric field strength from the signal looped back to the second portable device.

For another aspect of the present invention, there is provided a device for setting cell coverage for a radio communication system equipped with base station equipment and first and second portable devices, the device comprising: a mode setter for setting a zig mode, the mode setter being located in the first or second portable devices or in the base station equipment; and a switch which loops back a call signal input from the first portable device to the second portable device in a zig mode.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE PREFERRED EMBODIMENT

A preferred embodiment of the present invention is described below in detail with reference to the attached drawings.

In the following description, many specified things, such as specific circuit elements are shown. However, it is obvious to anyone who has common knowledge in this field of art that the present invention can be put in operation without these specific elements and they are provided only to promote the general understanding of the invention. In describing the present invention, a detailed explanation has been omitted if the relevant well known function or a detailed description of the composition could obscure the point of the present invention.

Figure 1:
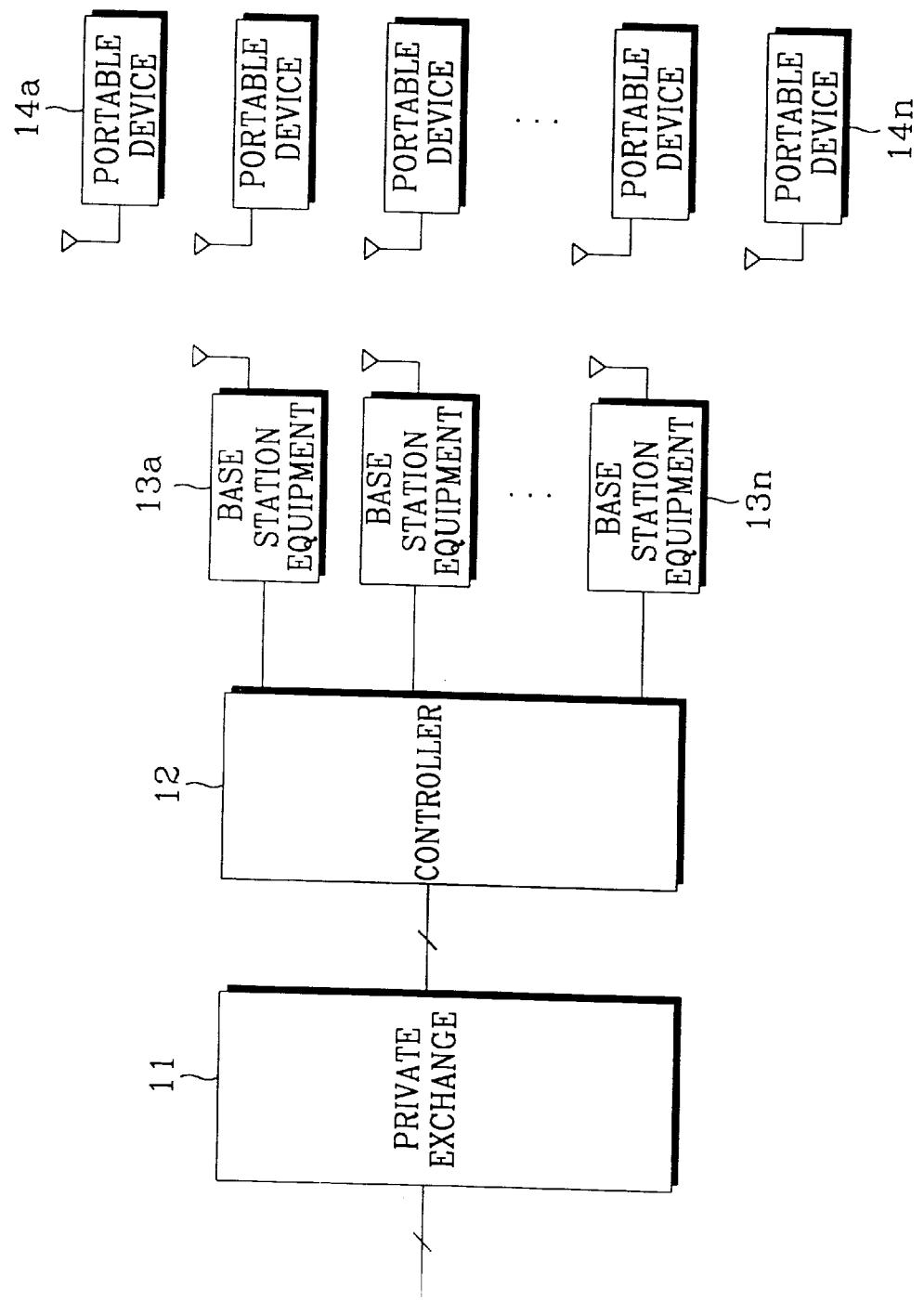
FIG. 1 is a diagram of a radio communication system, assuming that a cell coverage is set and thus the system is actually constructed.

FIG. 1 is a diagram of a radio communication system, assuming that it is actually constructed and composed of private exchange 11, controller 12, a plurality of base station equipment 13a–13n, and a plurality of portable devices 14a–14n.

According to the composition, in case of originating a call, the devices are connected in the sequence: portable device—base station equipment—controller—private exchange—office exchange (not shown). In case of receiving a call, they are connected in the sequence: office exchange—private exchange—controller—base station equipment—portable device.

To make a call to the portable device existing within a cell, they are connected in the sequence: the first portable device—base station equipment—controller—private exchange controller—base station equipment—the second portable device.

The above description is an explanation, assuming a case of an actual call in a previously constructed system to promote the understanding of the present invention. The present invention makes it possible to set an optimal cell coverage by making up such an environment most similarly. That is, the signal transmitted in the sequence: the first portable device—base station equipment—the second portable device. For this, a switch which loops back a signal from the first portable device to the second portable device is added to the base station equipment.

Figure 2:
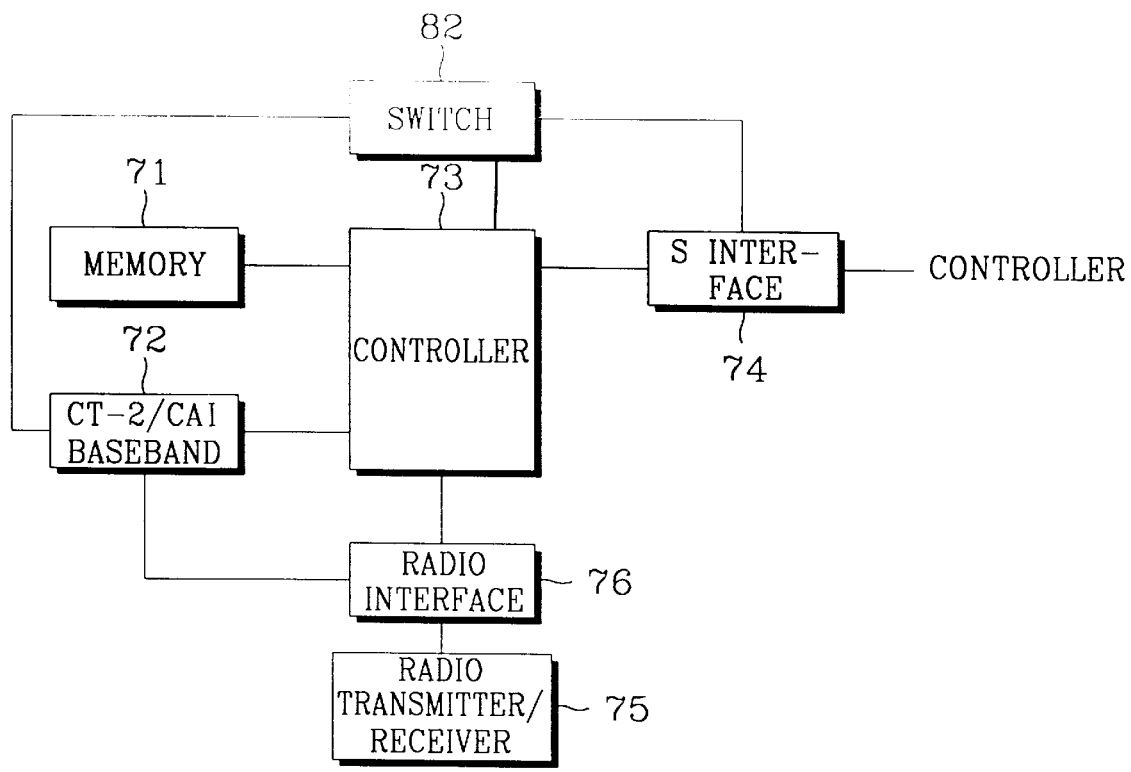
FIG. 2 is a schematic diagram of a base station equipment according to an embodiment of the present invention.

FIG. 2 is a schematic diagram of base station equipment according to an embodiment of the present invention. A switch 82 is added to the general composition. Memory 71 includes not only a program which controls its own operation of base station equipment but also a program which sets an optimal cell coverage according to the present invention. Controller 73 controls the overall operation to set an optimal cell coverage based on the above mentioned program.

Figure 3:
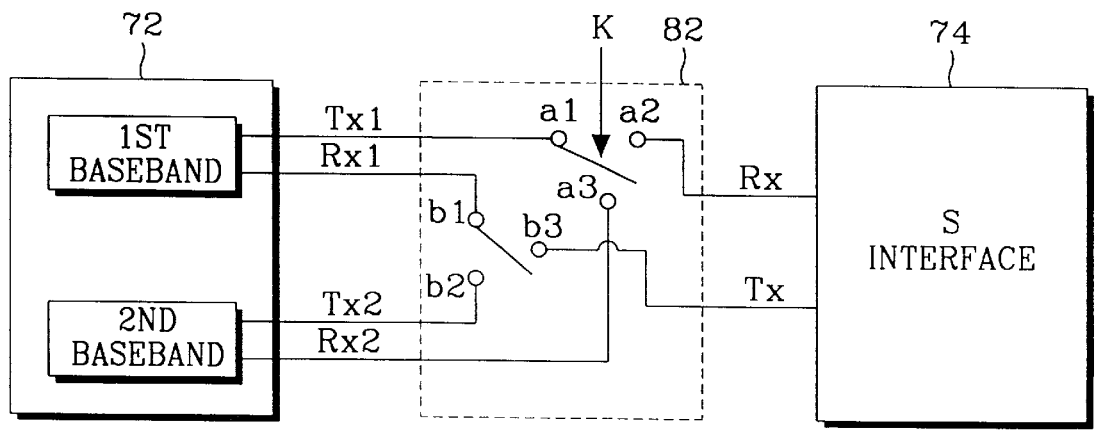
FIG. 3 is a diagram of showing the connections between the switch, CT-2/CAI baseband circuit and S interface in FIG. 2.

FIG. 3 is a diagram of showing the connections between switch 82, CT-2/CAI (Cordless Telephone Second Generation/Common Air Interface) baseband circuit 72 and S interface 74, and also showing PCM (Pulse Code Modulation) to each one, input or output ports Tx1, Rx1, Tx2, Rx2, for convenience taking CT-2/CAI baseband circuit having the first and second basebands respectively corresponding to the first and second portable devices.

Reference code K is a signal generated from the controller to control the operation of the switch 82 according to a normal mode or zig mode.

When a normal mode is selected, contact a1 is connected to contact a2, and contact b1 is connected to contact b3, so that the signal of the first portable device is transmitted to a private exchange through the S interface 74 via a controller. In case of the second portable device, contact b2 is connected to contact a2, and contact a3 is connected to contact b3.

When a user selects the zig mode for setting a cell coverage, contact a1 is connected to contact a3, and contact b1 is connected to contact b2 so that the signal of the first portable device is looped back to the second portable device. For this, using a portable device which has the zig mode selection key or a console of the base station equipment, a user sets the zig mode. In the base station equipment, the first portable device is placed in a virtual talking condition through the same procedure as in the case where a private exchange and controller are provided. As for the second portable device, the same procedure is taken as for the first portable device. The signal of the first portable device is looped back to the second portable device. In doing so, the effect of talking can be as if transmitted in the sequence: the first portable device—base station equipment—controller—private exchange—controller—base station equipment—the second portable device. In such a condition, if a cell coverage in which actual speech is possible is set while moving the location of the portable device, an optimal cell coverage can be set.

As described above, the present invention provides the advantage of setting a cell coverage after trying a virtual speech, connecting the two portable devices only through base station equipment, even though the whole system has not been constructed. That is, it has an advantage in that it can fully reflect not only the characteristics of the base station to be established but also the user's demand for the talking quality, thus minimizing the differences from the case of the actual operation.

It should be understood that the present invention is not limited to the particular embodiment disclosed herein as the best mode contemplated for carrying out the present invention, but rather that the present invention is not limited to the specific embodiments described in this specification except as defined in the appended claims.

what is claimed is:

1. An apparatus for setting cell coverage for a radio communication system, comprising: first and second portable devices;

base station equipment having a switch which loops back a signal from the first portable device to the second portable device in a zig mode;

a mode setter for setting the zig mode, the mode setter being located in one of either the first or second portable devices or the base station equipment; and a detector for detecting a received electric field strength from the signal looped back from the first portable device to the second portable device.

2. A method of setting cell coverage, using first and second portable devices, base station equipment having a switch for looping back a predetermined signal, and a device for measuring a received electric field strength, comprising the steps of:

setting a mode for setting cell coverage;

effecting a call from the first portable device to the second portable device;

looping back the signal from the first portable device to the second portable device in the base station equipment via the switch;

detecting a received electric field strength needed for setting cell coverage from the signal looped back to the second portable device via the received field strength measuring device.

3. An apparatus for setting cell coverage for a radio communication system equipped with base station equipment and first and second portable devices, comprising:

a mode setter for setting a zig mode, the mode setter being located in one of either the first or second portable devices or in the base station equipment; and a switch, disposed in the base station equipment, for looping back a signal from the first portable device to the second portable device when said mode setter sets the apparatus to the zig mode.

4. An apparatus for setting cell coverage for a radio communication system comprising:

a radio transmitter/receiver for receiving and transmitting radio signals;

first and second portable devices for transmitting and receiving radio signals;

a cordless telephone second generation and common air interface baseband circuit;

a radio interface circuit disposed between said cordless telephone second generation and common air interface baseband circuit and said radio transmitter/receiver;

a controller, having a memory, and connected to said cordless telephone second generation and common air interface baseband circuit and said radio interface circuit;

an S interface circuit connected to said controller; and a switch connected between said S interface circuit and cordless telephone second generation and common air interface, and also connected to said controller; said switch being controlled by said controller to loop back a signal from said first portable device to said second portable device; and a detector for detecting a received electric field strength from the signal looped back from first portable device to said second portable device.

* * * * *